United States Patent [19]

Mattern et al.

[11] Patent Number: 4,646,098

[45] Date of Patent: Feb. 24, 1987

[54] PHASE COHERENT DECOY RADAR TRANSMITTER

[75] Inventors: John Mattern, Catonsville; Don G. Kadron, Severna Park, both of Md.

[73] Assignee: Westinghouse Electric Corp., Pittsburgh, Pa.

[21] Appl. No.: 932,993

[22] Filed: Aug. 11, 1978

[51] Int. Cl.$^4$ .............................................. G01S 7/38
[52] U.S. Cl. ................................................. 342/14
[58] Field of Search ............................. 343/6 R, 18 E

[56] References Cited

U.S. PATENT DOCUMENTS

| | | | |
|---|---|---|---|
| 3,560,971 | 2/1971 | Alsberg et al. | 343/6 R X |
| 3,618,096 | 11/1971 | Schoneborn | 343/18 E |
| 3,896,442 | 7/1975 | Heminway et al. | 343/18 E |
| 3,909,828 | 9/1975 | Israel et al. | 343/18 E |
| 4,017,856 | 4/1977 | Wiegand | 343/18 E |

*Primary Examiner*—T. H. Tubbesing
*Attorney, Agent, or Firm*—W. E. Zitelli

[57] ABSTRACT

A decoy radar transmitter governed by a control signal derived from a main radar transmitter to emit radiation which is phase coherent with the carrier frequency of the main radar transmission is disclosed. A section of the main radar transmitter generates a control signal compositely formed by the combination of derived signals including a phase coherent subharmonic of the carrier frequency of the main radar, a frequency shift keyed signal and a signal having a power content. The frequency shift keyed signal is representative of a phase coded modulation sequence of the carrier frequency transmissions, each frequency fo the frequency shift keying corresponds to a phase polarity of the phase coding. A single coaxial cable conducts the composite control signal to the decoy radar transmitter. Upon receiving the composite control signal, a section of the decoy radar transmitter separates the power signal from the received control signal for use in energizing the decoy radar transmitter. The other signals are also separated from the compositely received control signal, whereupon the separated phase coherent subharmonic is frequency multiplied to approximately the carrier frequency of the main radar and the frequency shift keyed signal is frequency discriminated to obtain the phase coding sequence. Thereafter, the frequency multiplied phase coherent subharmonic is modulated with the obtained phase coding sequence to form a signal which governs the radar emissions of the decoy radar transmitter.

17 Claims, 2 Drawing Figures

PHASE COHERENT DECOY RADAR TRANSMITTER

BACKGROUND OF THE INVENTION

This invention relates to the broad field of radar counter measure devices, and more particularly to a system of at least one decoy radar transmitter, deployed away from and linked to a main tactical radar complex, for protecting said radar complex against attack from an armed radar homing missile by providing radar emissions which are phase coherent to the transmission of the radar complex.

Tactical stationary radar facilities are normally deployed at locations to provide surveillance of a portion of airspace to detect moving targets. These radar complexes usually employ a parabolic reflector type main antenna which generally comprises some predetermined array of feedhorns. The object of the antenna is to direct a pulsed pencil beam of radiation, known more commonly as the main lobe of radiation, in desired directions normally fanning the airspace. In addition to the main lobe, the radar antenna also transmits other unwanted radiations, known as side lobes, which result principally because of imperfections in the radar antenna design.

Radar radiation reflections from objects within the conveyed airspace are received by the radar receiver and are generally correlated by a moving target indicator (MTI) type processor which is generally incorporated as part of the radar receiver. The MTI usually is equipped with a signal conditioning and filtering processor which utilizes the phase information from the reflected pulse radiations to determine valid moving targets from existing environmental clutter. In operation, the radar transmitter sends out pulsed energy in an aimed direction at a predetermined pulsed repetition frequency (PRF). Reflections may be returned from a number of objects in each aimed direction within a known time portion (target return time) of each period of the PRF. The filter signal processor of the MTI normally compares the phase of successive reflected pulsed radiation information to discriminate moving targets from existing clutter. Returned pulse radiation which has little or no phase differences between successive reflections is usually considered as clutter and is rejected from other returned pulse radiation which bear substantial phase differences. The reflected radiation information passed by the MTI filter processor is considered as potential moving targets.

Recently, specific attack weaponry, known commonly as anti-radiation missiles (ARM), have been designed to home in on the side lobe radiation transmitted by the radar antenna for the purposes of destroying the radar facility. Some of these ARM's use broadband tuned receivers adjusted to radar frequencies as a means of direction tracking. Their guidance systems are known to direct the missile trajectory normal to detected wavefronts of the side lobe radiation generated from the main radar antenna, whereby the ARM may be automatically steered to the center of the radar antenna. These type ARM's are limited in their guidance dynamics by the response of their servodynamic mechanisms which is primarily interested in direction steering the ARM in the path toward the source of side lobe radiation.

One proposed method of counter measure against an ARM attack is the strategic deployment of one or more small radar transmitters, known as decoys, away from the main radar site. The purpose of these decoys is to transmit signals which attempt to imitate the main radar side lobe emissions to confuse an ARM that may be attacking a radar complex and cause the attacking ARM to impact harmlessly at a point away from both the main radar complex and the decoys. More specifically, the decoy transmissions are designed to combine in space with the main radar side lobe transmissions to compositely form wavefronts which appear to the guidance system of an ARM as being transmitted from a virtual side lobe radiation source remote from either the main radar complex or the decoy. These compositely formed wavefronts maintain confusion within the ARM's guidance system until the radar transmission wavefronts of either the main radar or decoys are singularly detected by the ARM; but by this time, it is estimated that the guidance mechanisms of the ARM are unable to respond to redirect the ARM away from the designated impact point set up by the compositely formed wavefronts. In order to confuse the ARM in the aforementioned manner, the decoys must approximate the main radar side lobe emissions as closely as possible. However, if the side lobe radiation is not emulated properly by the decoy, it may in addition to confusing the ARM also confuse the MTI function of the main radar. One likely possibility is in the case when the decoy signals are reflected off of stationary clutter and are received by the radar MTI processor during the target return time.

The side lobe radiation of some known proposed types of decoys are triggered off of the main transmission pulse of the radar which provides for time synchronizations of the side lobe radiation of the decoy with the main radar side lobe radiation, but does not provide for any phase coherent relationship therewith. Reflections off of stationary clutter from the side lobe radiation of these types of decoys may appear to the MTI portion of the radar receiver as if the Earth is shaking back and forth, in which case, all such clutter may have apparent doppler effects and be passed through the MTI filter processor. Thus, the side lobe radiation from these types of decoys may destroy the filter processing of the MTI, under certain conditions, by producing false doppler phase changing effects causing stationary clutter to be falsely identified as moving targets. Accordingly, if decoys of this type are used as a counter measure against attacking ARM's, the MTI processor of the main radar may not be capable of nulling out clutter properly under all conditions and in some cases, it may be difficult to distinguish an actual moving target from unfiltered clutter. Therefore, it appears that if decoys are to be a viable counter measure against ARM's for protection of a radar complex, the imitation of the main radar side lobe emissions by the decoy should be enhanced to the point where reflections from clutter will not interfere with the MTI processor's rejection of unwanted clutter.

In another aspect of main radar transmissions, the high frequency carrier waveform within the pulsed transmissions of the main radar are subjected, at times, to certain coded phase reversal patterns, like Barker codes, for example. Previously proposed decoy systems are not known to emulate main radar side lobe radiation to this extent. It may be possible, under some conditions, that the guidance system of an ARM may be capable of distinguishing the different phase patterns between the main radar and decoy side lobe radiation. To improve upon the counter measure protection provided by a decoy system, a better replica of the main side lobe radiation which includes these phase reversal patterns as provided by the decoy transmissions should be considered.

In addition, most known previously proposed decoys are to be individually provided with operating power away from the radar by means of an engine-generator set. In the case in which a plurality of decoys are deployed about the radar complex, each would require its own engine-generator set and associated fuel storage capabilities. Such proposed decoy installations have been considered relatively expensive and heavily burdened with mechanical apparatus which may tend to reduce their availability. Any improvement in decoy systems which would simplify the method of providing operating power hereto would surely enhance the probability of their becoming an integral part of all tactical radar complexes in the future.

SUMMARY OF THE INVENTION

In accordance with the present invention, a decoy radar transmitter is governed by a control signal derived from a main radar transmitter to emit radiation which is phase coherent with the carrier frequency content of the main radar transmissions. More specifically, a main radar-to-decoy link couples the main radar transmitter with at least one decoy radar transmitter. A portion of the link located at the main radar transmitter derives a composite control signal comprising a phase coherent subharmonic of the carrier frequency of the main radar, a signal representative of a phase coded modulation sequence of the carrier frequency transmissions of the main radar, and a signal having a power content. The composite control signal is transmitted to at least one decoy radar transmitter over a single conduction path. Another portion of the link is located at the at least one decoy radar transmitter to receive the composite control signal and to separate therefrom the power signal which is used for energizing the decoy radar transmitter. In addition, the another portion also separates the phase coherent subharmonic and the phase coding representative signal from the composite control signal. A frequency multiplication is performed to increase the frequency of the separated phase coherent subharmonic, preferably to the approximate value of the carrier frequency of the main radar transmitter. The phase coded modulation sequence is obtained from the separated phase coding representative signal and used to modulate the frequency multiplied phase coherent subharmonic to form a control signal which governs the radar emissions of the at least one decoy radar transmitter.

Preferably, the phase coded modulation sequence of the carrier frequency is derived at the main radar transmitter by frequency shift keying between a number of predetermined frequencies, each of which corresponding to a phase polarity of the phase coding sequence of the carrier frequency of the main radar transmitter. The frequency shift keyed signal is combined with the phase coherent subharmonic to compositely constitute a portion of the control signal. At the at least one decoy, the frequency shift keyed signal is separated from the composite control signal, preferably by a bandpass filter, and the phase coded modulation sequence is obtained by frequency discrimination of the filtered signal.

DESCRIPTION OF THE PREFERRED EMBODIMENT

Figure 1:
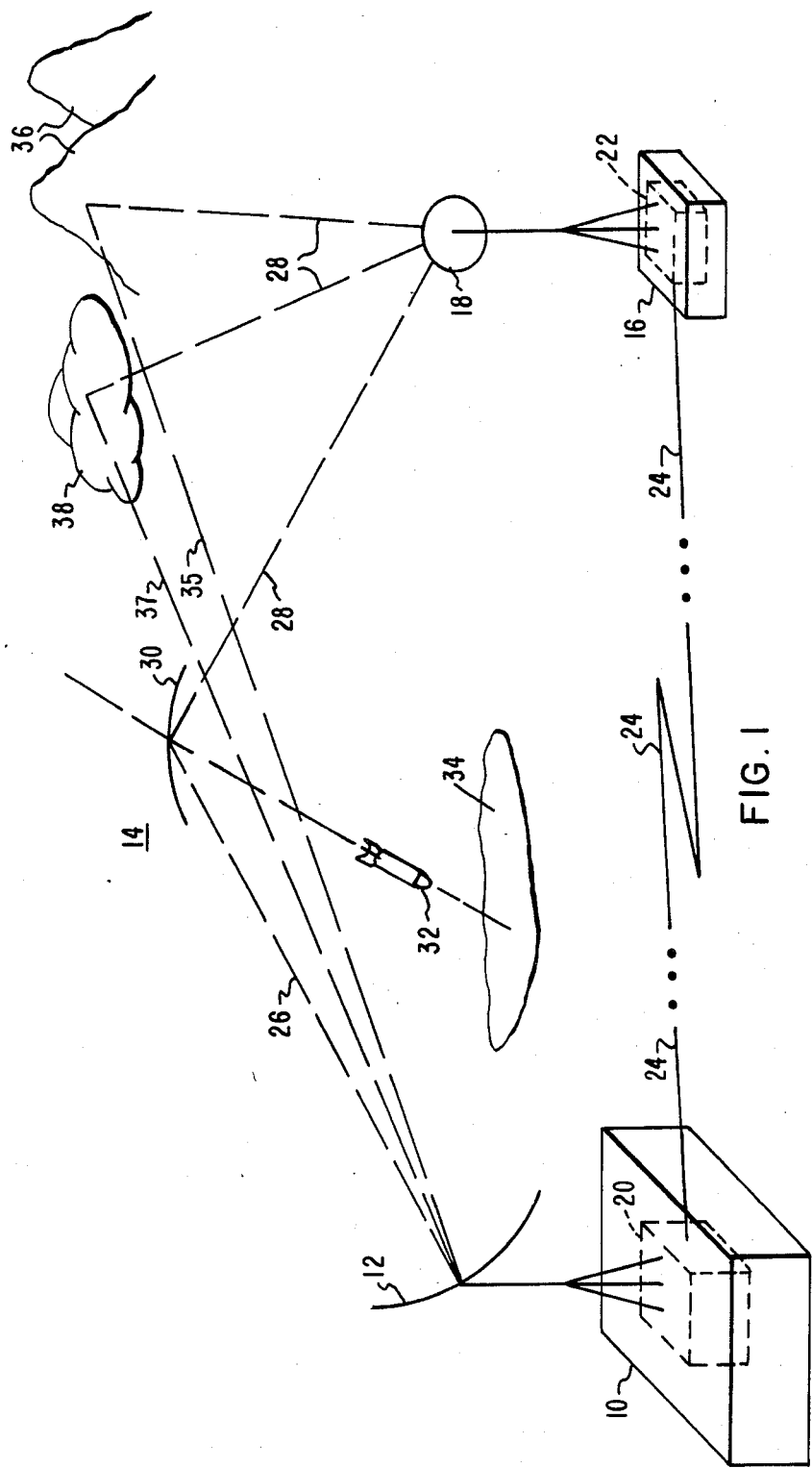
FIG. 1 is a simplified sketch of a radar installation suitable for embodying the principles of the present invention.

Referring to FIG. 1, a main radar complex 10 including a radar transmitter (not shown) and a directional antenna 12 both of the type wellknown in the pertinent art, is tactically located for surveillance of an air space 14. Deployed a predetermined distance from the main radar complex 10 is at least one decoy radar transmitter 16 which includes a conventional omnidirectional type transmitting antenna 18. A main radar-to-decoy link, which may be comprised of portions 20 and 22 of the main radar 10 and decoy 16, respectively, tied together by a single signal path 24 which may be a coaxial cable or other suitable conducting path, delivers a composite signal formed by the portion 20 of the main radar 10 and transmitted over the conduction path 24 to the portion 22 of the decoy 16. The composite signal passing over the single conduction path 24 provides the decoy with its sole source of operational power and a control signal which governs the radar transmissions of the decoy 16.

In operation, the radar antenna 12 of the main radar complex 10 may generate a certain amount of side lobe radiation denoted simply in the sketch of FIG. 1 by the dotted line 26. That portion 20 of the radar-to-decoy link derives signals which are representative of the characteristics of the transmissions 26 of the main radar 10. These derived signals are compositely conducted along with a power signal through path 24 to the portion 22 of the decoy 16. (The portions 20 and 22 of the radar-to-decoy will be described in greater detail hereinbelow. Separation of the power signal from the derived signal is performed at portion 22 of the decoy 16. In addition, portion 22 deciphers the main radar emission characteristic information from the received desired signals and governs the radiation transmitted from the decoy antenna 18 in accordance therewith. The decoy transmissions are denoted simply in the sketch of FIG. 1 on the dotted lines 28. As was described briefly in the Background section, some emissions 28 from the decoy 16 may combine with the main radar emissions 26 to form a number of wavefronts, one of which is shown simply at 30, in accordance with well known principles of microwave radiation theory. These wavefronts 30 are produced to confuse any attacking anti-radiation missles (ARM) or other similar radar homing type attack missles, shown simply at 32, and cause the attack missle 32 to impact harmlessly in an area 34 remote from both the main radar complex 10 and decoy 16.

In addition to confusing the guidance systems of the ARM 32 by effecting wavefronts 30 in the airspace 14, the radar emissions 28 may also be reflected from stationary clutter 36, such as mountain ranges, or slow moving clutter 38, such as rain clouds, for example. As shown simply in FIG. 1, these reflected emissions 35 and 37 may be received by the antenna 12 of the main radar complex 10 and may possibly interfere with the signal processing of a moving target indicator (MTI) system which is a conventional part of the radar complex 10. However, the radar-to-decoy link of the preferred embodiment provides for governing the radar emissions 28 of the decoy 16 to be phase coherent with the radar transmissions of the main radar 10, which will be described in greater detail hereinbelow, thus, greatly reducing the probability of interference with the workings of the MTI processor as a result of reflections from the decoy emissions. Furthermore, the radar-to-data link is additionally capable of governing the radar emissions 28 to the extent of imitating any sophisticated phase coding, similar to that of Barker codes, for example, which may be imparted to the radar emissions 26.

Figure 2:
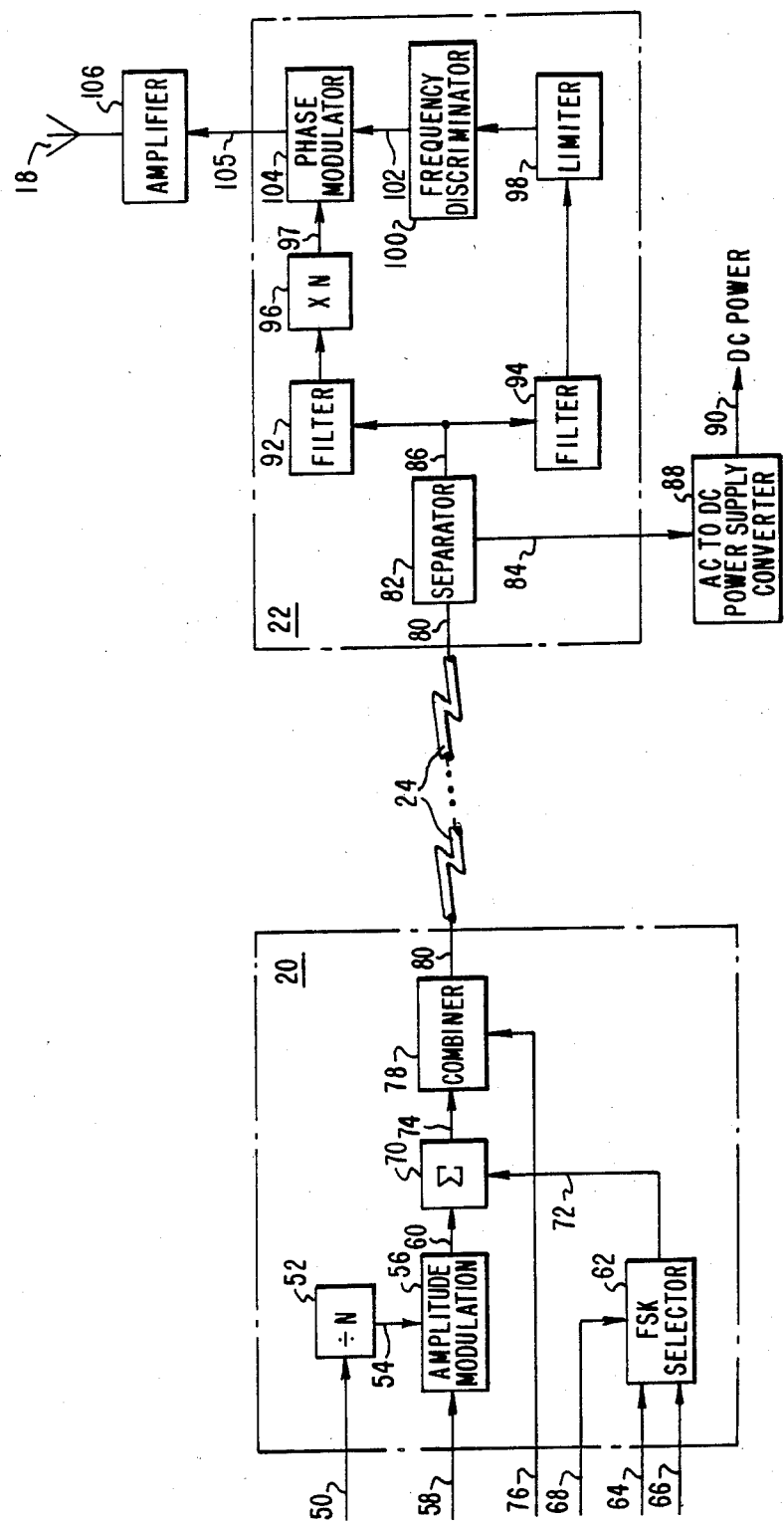
FIG. 2 is a schematic block diagram of a main radar-to-decoy link suitable for use in the embodiment of FIG. 1.

Referring now to the radar-to-decoy link which is displayed functionally in FIG. 2, a signal 50, which is representative of the unmodulated carrier frequency of the radar transmitter 10, is input to a frequency divider function 52 incorporated into the portion 20 of the main radar 10. The signal 50 is preferably selected at a point in the radar transmitter 10 where the carrier frequency is in the range of hundreds of megahertz prior to being boosted to the gigahertz range. Consequently, the frequency divider 52 may be comprised of a cascaded number of digital down counters, the design of which being well known in the pertinent art. The resulting output signal 54 of the frequency division is a phase coherent subharmonic of the unmodulated radar carrier frequency and is subsequently pulse modulated by an amplitude modulation function 56 which is cascaded downstream of the frequency divider network 52. A pretrigger signal 58 which may be selected from the circuitry of the radar transmitter 10, preferably from that portion which produces the phase coding of the carrier waveform, is used to provide an indication to the amplitude modulation function 56 that the radar 10 will transmit a pulsed envelope of radiation at some predetermined later time. The pretrigger signal 58 is generally synchronized with the pulse repitition frequency (PRF) of the radar transmitter 10 which may be either fixed or variable. The function 56 may key on the pretrigger signal 58 to pulse modulate the phase coherent subharmonic signal 54 based on a predetermined time delay and pulse width, both of which may be adjusted for the purpose of compensating for delays resulting from the circuit embodiment functionally shown in FIG. 2 or even, for further confusing the ARM by manipulating the radar transmissions of the decoy 16. Thus, the principal function of the amplitude (pulse) modulator 56 is to provide a signal 60 having a pulsed envelope of the phase coherent carrier frequency subharmonic in some predetermined timed relationship with the pulsed transmissions of the main radar 10, the strategy being to most effectively confuse the ARM with the embodied circuitry. Pulse modulators, like function 56, are well known to the pertinent art and are generally embodied with high frequency switching diodes, like pin diodes, for example, to provide a configuration in which there exists a delay element responsive to the pretrigger signal and a pulse generator element responsive to the delay element to generate the output signal 60.

A conventional frequency shift keying (FSK) function 62 is additionally disposed in the portion 20 of the radar-to-decoy link for the purposes of detecting the phase coding imparted to the carrier frequency of the radar 10 prior to transmission. Two suitable frequencies $F_1$ and $F_2$ may be selected from a range of available frequency signals within the radar transmitter 10 and may be coupled to FSK function 62 over signal lines 64 and 66, respectively. It is understood that a frequency generator may alternatively be employed within the portion 20 to generate the freqencies $F_1$ and $F_2$ in lieu of selecting them from the radar transmitters without departing from the scope of the invention. A third input signal 68 to the FSK function 62 may be provided from the phase coding portion of the radar transmitter 10 and may be concomitantly representative of the phase polarity being imported to the carrier frequency being transmitted by radar 10. Accordingly, the input signal 68 governs the selection of use of the frequencies $F_1$ and $F_2$ supplied to FSK function 62 corresponding to the phase coded polarity imparted to the radar carrier frequency.

A sequence of selected frequencies including $F_1$ or $F_2$ effected by the FSK function 72 is coupled to a conventional combiner 70 over signal line 72. In the combiner 70, the sequence of selected frequencies including $F_1$ and $F_2$, which are representative of the phase coded polarity of the main radar transmissions, is conventionally combined with the phase coherent subharmonic of the main radar carrier to form a control signal 74 which includes the phase characteristic information of the main radar carrier frequency transmission.

The control signal 74 may be combined with a power signal 76 which should be of a low enough frequency to be easily separated from the control signal 74 at a downstream point within the radar-to-decoy link. Preferably, the power signal 76 is derived from a convenient 400 HZ power source generally disposed within the radar transmitter 10. The combiner, which is shown at 78, may be embodied with well known circuits in a configuration which permits little to no interaction between the high frequency control signal 74 which is in the range of tens of megahertz and the low frequency power signal 76 which may be approximately 400 Hz. A suitable embodiment (not shown) may be comprised of a first circuit element having principally capacitive properties of an appropriately chosen value being disposed in series with the control signal 74 so as to provide very low impedance to high frequency components, and very high impedance to low frequency components; a transformer element which provides isolation for the coupling of the power signal 76 to the combiner 78 and may, in addition, step up the voltage of the power signal 76, say in the order of thousands of volts, to reduce the losses in the signal transmission through the coaxial path 24; and a second circuit element having principally inductive properties of an appropriately chosen value being disposed between the capacitive element and transformer element to provide high impedance to the high frequency components and low impedance to low frequency components. A composite signal 80 may be formed at the connection of the capacitive and inductive elements, for example, for transmission through the coaxial path 24.

As was described in connection with FIG. 1, the radar 10 and decoy 16 are connected by a single conduction path 24 which may be a coaxial cable, for example. A suitably chosen cable may be one which has a cable load of about 400Ω and an impedance of around 50 to 75Ω. It is not necessary for the cable to be impedance matched for the power signal frequency at the receiving end, in particular, but it should exhibit short line characteristics at the power signal frequency and act as a shunt capacitor. Normally, the working voltage of the cable is chosen to be approximately twice the operating voltage which may be around 1500 volts RMS so that the 400 Hz power signal conducted to the decoy is in the range of 4 to 5 KW which adequately meets the requirements of most decoys.

Separation of the power signal 76 from the composite signal 80 is performed by a separator function 82 which may be embodied in a similar configuration as that of the combiner 78. That is, the composite signal 80 may be coupled to both a capacitive and an inductive element (not shown), the inductive element having an appropriately chosen value to pass substantially the low frequency power signal 84 attenuated slightly by the loss of passive elements in the link and the capacitive element having an appropriately chosen value to pass substantially high frequency control signal 86 also attenuated slightly by the loss of circuit elements of the link. The passed power signal may be coupled to a conventional AC to DC power supply converter 88 wherein a transformer element may be utilized to step down the voltage of the power signal 84 to a convenient operational level suitable for the type of circuitry embodying the decoy 16. The converter 16 may additionally rectify and filter the stepped down voltage signal to effect a DC voltage power signal 90 which may be distributed to the circuits of the decoy 16.

The separated high frequency control signal 86 may be coupled simultaneously to two conventional bandpass filters 92 and 94. The bandpass filter 92 has a center frequency value selectively adjusted so that it passes the frequency of the subharmonic signal 54 and substantially filters out the FSK frequencies including $F_1$ and $F_2$. Likewise, the bandpass filter 94 has a center frequency selectively adjusted so that the filter 94 passes the frequencies including $F_1$ and $F_2$, but substantially filters out the subharmonic frequencies of signal 54. Cascaded with the filter 92 is a frequency multiplier function 96 which multiplies the output of filter 92 to a higher frequency value which may be the value of the carrier frequency used in the main radar 10. The multiplier 96 may be embodied with a phase-locked loop (PLL) for performing the initial stages of multiplication, say while still in the hundreds of megahertz range and the final stages of multiplication may be performed by any number of well-known circuits including a cascaded number of voltage doublers comprised of transformer diode configurations, for example, which may ultimately generate a phase coherent replica 97 of the carrier frequency of the main radar 10. Concurrently, the output of the bandpass filter 94 may be voltage limited by a conventional limiter circuit 98 to effect a substantially constant amplitude waveform which may be thereafter submitted to a frequency discriminator 100. The frequency discriminator 100 identifies the frequency, like $F_1$ or $F_2$, for example, present at the output of filter 94 and produces a signal state, normally a high level (true) or low level (false), at its output 102 representative thereof. Thus, the signal state of the discriminator output 102 varies in accordance with the phase coding specified at the main radar 10.

A conventional phase modulator circuit 104 may provide for both an in-phase and 180° out-of-phase split of the phase coherent replica signal 97 and in addition, selects one of either the in-phase or out-of-phase signals in accordance with the state of signal 102. Accordingly, the output signal 105 of the phase modulator 104 is not only a phase coherent replica of the pulsed carrier frequency radiation of the main radar 10, but also emulates the phase coding of the carrier frequency within the pulsed envelope. A conventional radar amplifier 106 is governed by the output signal 105 to drive an omnidirectional antenna 18 which suffices to generate side lobe type radiation that substantially emulates the amplitude characteristics of the side lobe type radiation of the main radar.

In summary, at the main radar 10, an unmodulated radar carrier frequency monitored signal or some phase coherent representative thereof 50 is frequency divided (52) to effect a phase coherent subharmonic signal 54 which is pulsed modulated (56) in a predetermined time relationship with the pulsed modulation of the radar transmissions utilizing pretrigger information (58) supplied by the radar transmitter 10. In addition, the phase coding information imparted to the carrier frequency within the pulsed transmissions of the radar 10 are specified by frequency shift keying between at least two frequencies $F_1$ and $F_2$ (62). For example, if the carrier frequency is to be transmitted inphase during a portion of the pulsed transmission, then frequency $F_1$ may be selected and similarly, if the carrier frequency is to be transmitted 180° out-of-phase during another portion of the pulsed transmission, then frequency $F_2$ may be selected. The frequency representative phase coding information is combined with the pulsed phase coherent subharmonic (70) to form a control signal 74 which is to be used to govern the transmissions of the decoy transmitter 16. A power signal 76 which may have a low frequency of approximately 400 Hz is stepped up in voltage, say to one or two kilovolts, for example, and combined with the control signal 74 for transmission over the single conduction path 24.

At the decoy transmitter 16, the high voltage power signal is stripped (82) from the composite signal 80 and manipulated to provide the primary source of power to the decoy radar transmitter. The pulsed phase coherent carrier frequency subharmonic and the frequency shift keying signal representative of the phase coding are separated (82) from the remaining control signal 86 utilizing filters 92 and 94, respectively. The separated phase coherent carrier frequency is multiplied in frequency (96) to the value of the radar carrier frequency, thus effecting a phase coherent replica of the transmitted carrier frequency of the radar 10. The sequential phase coding information is discriminated (98 and 100) from the FSK signal and correspondingly imparted to the pulsed replica 97 of the radar carrier frequency at 104, thus reproducing the phase coding of the main radar transmitter 10 within the pulsed replica of the phase coherent carrier frequency 97. The phase coherent, phase coded, pulsed replica of the carrier frequency signal 105 then governs the radar transmissions of the decoy utilizing a conventional radar amplifier 106 and omnidirectional antenna 18 which are suitable for the purposes of generating side lobe type radiation. In this manner, a decoy radar transmitter 16 is governed by the main radar transmitter to generate radar emissions which have coherent phase characteristics with the transmissions of the main radar 10.

It is understood that while the present invention has been described hereinabove in connection with a particular embodiment, it should not be so limited to any one embodiment, but rather should be construed broadly in accordance with the breadth and scope of the following claims.

We claim:

1. A decoy radar transmitter governed by a control signal derived from a main radar transmitter to emit radiation which is phase coherent with the carrier frequency content of the radar transmissions of said main radar transmitter.

2. A decoy radar transmitter in accordance with claim 1 including a first means for separating from the governing control signal a first signal for energizing the decoy radar transmitter and a second signal for representing the phase characteristics of the carrier frequency content of the radar transmission of the main radar transmitter.

3. A decoy radar transmitter in accordance with claim 2 including a second means for filtering from the separated second signal of the governing control signal a signal representative of a phase coherent subharmonic of the carrier frequency of the main radar transmitter.

4. A decoy radar transmitter in accordance with claim 3 including a third means for filtering from the second signal a signal representative of phase coding information which may be imparted to the carrier frequency during transmissions of the main radar transmitter.

5. A decoy radar transmitter in accordance with claim 4 including a fourth means for discriminating frequencies from the signal representative of the phase coding information which is in the form of a frequency shift keyed signal, each frequency of said shift keying corresponding to the phase polarity of the phase coding of the carrier frequency of the main radar transmitter.

6. A system including a main radar transmitter, at least one decoy radar transmitter, and a main radar-to-decoy link coupling each decoy radar transmitter with said main radar transmitter, said main radar transmitter being operative to transmit a carrier frequency having known phase characteristics, said main radar-to-decoy link comprising:
   first means disposed at said main radar transmitter for deriving signals representative of said known phase characteristics of said carrier frequency transmissions of said main radar;
   a conduction path for coupling the derived signals of said first means to said at least one decoy radar transmitter; and
   second means disposed at each decoy radar transmitter for receiving said derived signals of said first means and operative to process said derived signal of said first means to generate control signals which govern said decoy radar transmitter to emit radiation that is phase coherent with the carrier frequency transmissions of the main radar transmitter.

7. A system in accordance with claim 6 wherein the first means includes means for forming a composite signal, comprising the derived signals and a power signal; and means for coupling said composite signal to the second means of the at least one decoy radar transmitter over the conduction path; and wherein the second means includes means operative to separate said power signal from the derived signals of the composite signal and to utilize said separated power signal to energize the radar decoy transmitter.

8. A system in accordance with claim 6 wherein the first means including means for compositely forming a signal comprised of a phase coherent subharmonic of the unmodulated carrier frequency of the main radar transmitter and a signal which is representative of a phase coded modulation sequence of the carrier frequency of the main radar transmission.

9. A system in accordance with claim 8 wherein the first means further includes means for generating the signal representative of the phase coded modulation sequence by frequency shift keying between a number of predetermined frequencies, each of which corresponding to a phase polarity of said phase coding.

10. A system in accordance with claim 9 wherein the second means includes:
   means for separating the phase coherent subharmonic from the frequency shift keyed signal of the derived signals which are representative of the phase characteristics of the carrier frequency of the main radar;
   means for frequency multiplying the phase coherent subharmonic;
   means for discriminating the predetermined frequencies of the separated frequency shift keyed signal to establish the phase coded modulation sequence of the main radar carrier frequency transmissions; and
   means for phase modulating said frequency multiplied phase coherent subharmonic with said established phase code modulation sequence to form a signal for governing the emissions of the decoy radar transmitter.

11. A system in accordance with claim 10 wherein the frequency multiplying means comprises means for multiplying the frequency of the phase coherent subharmonic to substantially the carrier frequency of the main radar transmitter.

12. An electronic link coupling a decoy radar transmitter and a main radar transmitter, said link having a single conduction path over which a composite signal, comprising an operational power signal content and radar transmission control signaling content, is transmitted from said main radar transmitter to said decoy radar transmitter for governing the operation of said decoy radar transmitter.

13. An electronic link in accordance with claim 12 wherein said conduction path is a coaxial cable.

14. A method for governing a decoy radar transmitter to emit radiation having a carrier frequency which is phase coherent with the carrier frequency radiation of a main radar transmitter, said method comprising the steps of:
   forming a composite signal comprised of a phase coherent subharmonic of the carrier frequency of said main radar transmitter and another signal which is reperesentative of a phase coded modulation sequence of the carrier frequency transmissions of said main radar transmitter;
   conducting said composite signal to said decoy radar transmitter;
   separating said phase coherent subharmonic and said another signal from said formed composite signal;
   multiplying the frequency of said separated phase coherent subharmonic to increase the frequency value thereof;
   discriminating the phase coded modulation sequence from said separated another signal;
   modulating said frequency multiplied phase coherent subharmonic with said discriminated phase coded modulation sequence to form a signal which governs the emission of the decoy radar transmitter, whereby said decoy emissions are phase coherent with the carrier frequency transmissions of said main radar transmitter.

15. The method in accordance with claim 14 wherein the composite signal is formed to further include a signal having a power content; and wherein the method further includes the step of separating said power signal from said composite signal at the decoy radar transmitter for use in energizing the decoy radar transmitter.

16. The method in accordance with claim 14 wherein the step of forming another signal includes the step of frequency shift keying between a number of predetermined frequencies to form the another signal, each predetermined frequency corresponding to the phase polarity of the phase coded modulation sequence of the carrier frequency of the main radar transmitter; and wherein the step of forming the composite signal includes the step of combining the phase coherent subharmonic with the frequency shift keyed another signal.

17. The method in accordance with claim 16 wherein the step of separating includes bandpass filtering of the phase coherent subharmonic and the frequency shift keyed another signal from the composite signal.

* * * * *